Jan. 20, 1948.          C. E. DEARDORFF          2,434,642
                         CREAM SEPARATOR
                        Filed July 17, 1944
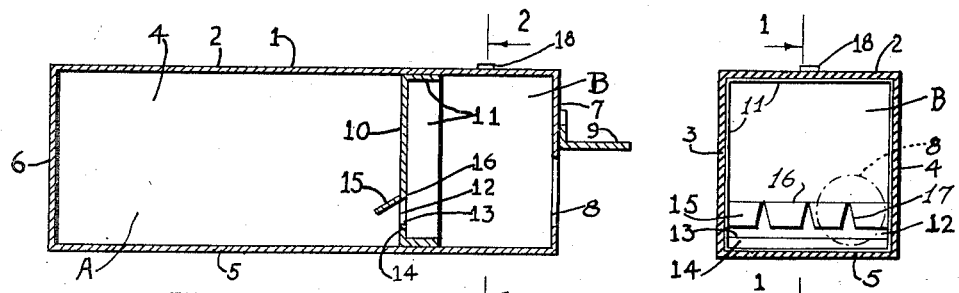
FIG. 1.      FIG. 2.
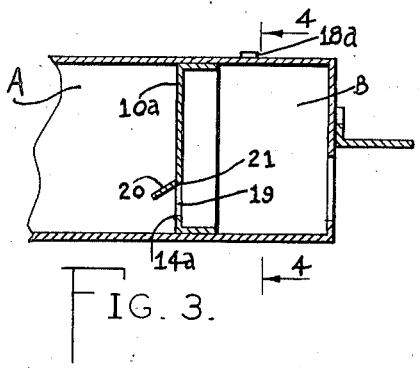   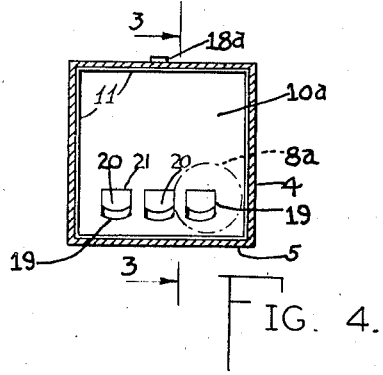
FIG. 3.      FIG. 4.
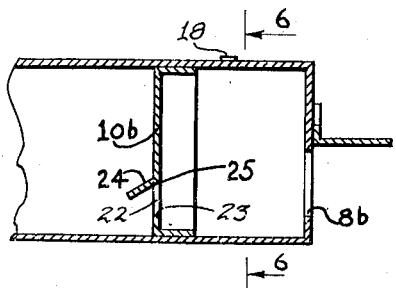   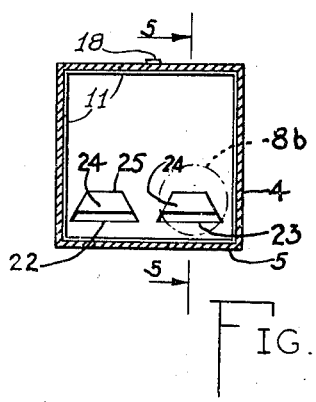
FIG. 5.      FIG. 6.
INVENTOR.
CLARENCE E. DEARDORFF
BY
ATTORNEYS Patented Jan. 20, 1948

2,434,642

UNITED STATES PATENT OFFICE 2,434,642

CREAM SEPARATOR

Clarence E. Deardorff, Sacramento, Calif., assignor to C. E. Deardorff, Inc., a corporation of California Application July 17, 1944, Serial No. 545,357

6 Claims. (Cl. 229—15)

The present invention relates to improvements in a cream separator, and it consists of the combinations, constructions and arrangements hereinafter described and claimed.

An object of my invention is to provide a different type of cream separator than that shown in my co-pending application on a cream separator, Serial No. 473 564, filed January 25, 1943, now Patent No. 2,399,665; and that shown in another application for a cream separator filed July 17, 1944, Serial No. 545,356. In the first filed application, a ledge is used in combination with a partition for creating a vacuum in the milk compartment when the container is held in a predetermined manner for pouring cream from the cream compartment. A simple rocking of the container about its longitudinal axis when in pouring position will release the vacuum and permit the milk to pour from the milk compartment.

In the second co-pending application I have shown that the ledge may be placed at any position in the cream compartment, from a position just in advance of the partition up to a point where the ledge forms an integral part of the carton cover. The operation of the form of the invention shown in the second case is identical to that shown in the first case.

In the present invention, the ledge is made to lie in the same plane as the partition so as to become an integral part thereof and the device will work on the vacuum principle in the same manner as the other devices shown in the two co-pending applications, as will be hereinafter more fully set forth. The device is extremely simple in construction and has no moving parts.

Other objects and advantages will appear in the following specification, and the novel features of the device will be particularly pointed out in the appended claims.

My invention is illustrated in the accompanying drawing forming a part of this application, in which:

Figure 1 is a longitudinal section of the container and is taken along the line 1—1 of Figure 2;

Figure 2 is a transverse section through the cream compartment and is taken along the line 2—2 of Figure 1;

Figure 3 is a longitudinal section of a modified form of the invention and is taken along the line 3—3 of Figure 4;

Figure 4 is a transverse section through the cream compartment and is taken along the line 4—4 of Figure 3;

Figure 5 is a longitudinal section through another modified form of the invention and is taken along the line 5—5 of Figure 6; and Figure 6 is a transverse section through the cream compartment and is taken along the line 6—6 of Figure 5.

While I have shown only the preferred forms of my invention, it should be understood that various changes or modifications may be made within the scope of the appended claims without departing from the spirit and scope of the invention.

In carrying out my invention I provide a container 1 which is preferably rectangular in longitudinal section and has side walls 2, 3, 4 and 5, a bottom wall 6 and a cover 7. The container is designed to hold a quart of liquid such as milk and is provided with a pouring opening 8 that can be closed by a cover 9. Figure 2 shows the opening 8 disposed in the corner formed by the walls 4 and 5. The container may be of any size desired and can dispense liquids other than milk.

My invention comprises a partition 10 placed at the cream line and the partition has flaps 11 which may be glued or otherwise secured to the carton walls. In this way the partition is securely fastened in place.

The partition has a slot 12 formed therein with the upper edge 13 of the slot extending parallel to the wall 2 of the container, see Figure 2. The upper edge 13 defines a ledge 14 that is integral with the partition 10.

I provide a flap 15 that is integral with the partition 10 and is bent so as to make an angle with the plane of the partition starting at the fold line 16. The slot 12 extends from side to side of the carton and so does likewise the flap 15. Figure 1 shows the flap extending at an angle with respect to the plane of the partition and Figure 2 shows the flap provided with a plurality of V-shaped notches 17.

From the foregoing description of the various parts of the device, the operation thereof may be readily understood.

The slot 12 is large enough to permit the interior of the carton to be waxed in order to make the carton liquid-proof. A marker 18 is placed on the wall 2. The carton is placed in a vertical position when it is filled with milk and the slot 12 is large enough to permit the milk to fill the milk compartment A and also the cream compartment B as fast as the milk enters the carton through the opening 8. The V-notches 17 extend substantially to the fold line 16 and therefore the cream in the compartment A will rise through the slot 12 and the notches and will enter the cream compartment B while the carton stands in an upright position. The notches prevent the cream from being trapped in back of the flap. The cream will rise to the top of the carton in the same manner as it does in a milk bottle or in any other type of container.

In pouring cream from the device the carton is swung into a horizontal position as shown in Figure 1, care being taken that the mark 18 is uppermost at all times. This will dispose the edge 13 in a horizontal position during the pouring operation and will incline the flap 15 in a position to reduce the effective size of the opening 12. A vacuum will be created in the milk compartment A by the flap and slot which will prevent the milk from flowing through the slot 12 while the cream is being dispensed through the opening 8. All of the cream can be poured from the cream compartment without any milk being dispensed so long as the container is maintained in a substantially horizontal position with the wall 2 placed uppermost.

When milk is desired to be poured, the container can be rocked about its longitudinal axis either in a clockwise or counter-clockwise direction when looking at Figure 2. A clockwise direction is preferred because then the wall 4 will be swung to the bottom of the container and the outlet opening 8 will be placed close to the lower wall. The slot 12 will be swung into a vertical position and air will enter the milk compartment A and release the vacuum to permit the milk to be poured from the slot 12 and then pass out through the opening 8. A simple rocking of the carton about its longitudinal axis back into the position shown in Figure 2 will act as a valve to stop any further flow of milk from the compartment A should any milk still remain in the compartment.

In Figures 3 and 4 I show a slightly modified form of the invention. Here the partition 10a has a plurality of openings 19 arranged in a line with a flap 20 for each opening, the flaps being bent along a fold line 21 so that the flaps will extend rearwardly at an angle, as shown in Figure 3. The outlet opening 8a is disposed at the corner formed by the walls 4 and 5.

The operation of this form of the invention is the same as described for the form shown in Figures 1 and 2. The cream will not be trapped by the flaps 20 in rising from the milk compartment A into the cream compartment B because the edges of the openings 19 extend to the fold line 21 and permit the cream to pass from a position below the partition into a position above the partition. The marker 18a must be maintained uppermost during the pouring operation if only cream is to be dispensed from the cream compartment. The openings 19 define a ledge 14a that is integral with the partition to provide a vacuum within the milk compartment that will prevent the milk from being dispensed. A rocking of the container about its longitudinal axis to bring the wall 4 into the lowermost position will permit the air to enter the milk compartment through the top opening 19 and release the vacuum so that milk can be dispensed. A valve action for stopping the milk from pouring at any time is possible by merely rocking the container back into the position shown in Figure 4.

Still another modified form of the invention is shown in Figures 5 and 6. Here the openings 22 are in the form of isosceles trapezoids with the bases of the trapezoids forming edges 23. The flaps 24 are folded along the lines 25 so that the flaps will be inclined with respect to the plane of the partition 10b. The outlet opening 8b is placed at the corner formed by the walls 4 and 5. The operation of this form of the device is identical to that shown in Figures 3 and 4 and therefore no further description of this form need be given.

In all of the forms illustrated, the edge of the slot or opening disposed opposite the flap cooperates with the end of the flap for limiting the effective height of the slot or opening when the device is in a position for pouring cream so that a vacuum will be created in the milk compartment and prevent the milk from being dispensed. When the container is in an upright position, the angle of the flap will not prevent the quick passage of milk through the opening 12 when filling the milk compartment.

I claim:

1. The combination with a container adapted to hold a fluid and having a top with an opening therein, of a partition extending transversely across the container and dividing it into an upper and a lower compartment, said partition having an opening therein with a fixed short flap connected to one side edge of the opening and extending at an angle into the lower compartment so as to partially cover the opening, the container when held in substantially horizontal pouring position with the fixed flap hanging downwardly having the effective height of its partition opening reduced to a point where a vacuum will be formed in the lower compartment and will retain the fluid therein while permitting the fluid in the upper compartment to be dispensed, and means on the container for indicating in what position to hold the container to have the fixed flap hang downwardly and dispense fluid only from the top compartment.

2. The combination with a container adapted to hold a fluid and having a top with an opening therein, of a partition extending transversely across the container and dividing it into an upper and a lower compartment, said partition having an opening therein with a fixed flap connected to one edge of the opening and extending at an angle into the lower compartment so as to partially cover the opening, the container when held in substantially horizontal pouring position with the fixed flap hanging downwardly having the effective height of its partition opening reduced to a point where a vacuum will be formed in the lower compartment and will retain the fluid therein while permitting the fluid in the upper compartment to be dispensed, and means on the container for indicating in what position to hold the container to have the fixed flap hang downwardly and dispense fluid only from the top compartment, and said fixed flap having notches therein for permitting all of the fluid of lighter specific gravity in the lower compartment to gravitate to the upper compartment.

3. The combination with a milk holding carton having a top with an opening therein and four side walls, of a partition extending transversely across the container at the cream line and dividing it into an upper cream compartment and a lower milk compartment, said partition having a slot extending between opposed side walls of the container, and a fixed flap extending from the slot edge disposed nearest the partition center, said fixed flap extending downwardly at an angle into the milk compartment so as to partially cover the slot, a mark on the carton for indicating to the operator how to hold the carton in pouring position so that the fixed flap will hang downwardly, the fixed flap when in this position reducing the effective height of the slot to a point where a vacuum will be created in the milk compartment to retain the milk therein.

4. The combination with a milk holding carton having a top with an opening therein and four side walls, of a partition extending transversely across the container at the cream line and dividing it into an upper cream compartment and a lower milk compartment, said partition having a slot extending between opposed side walls of the container, and a fixed flap extending from the slot edge disposed nearest the partition center, said fixed flap extending downwardly at an angle into the milk compartment so as to partially cover the slot, a mark on the carton for indicating to the operator how to hold the carton in pouring position so that the fixed flap will hang downwardly, the fixed flap when in this position reducing the effective height of the slot to a point where a vacuum will be created in the milk compartment to retain the milk therein, and V-shaped notches in the fixed flap for permitting cream to pass from the milk to the cream compartment when the carton is in an upright position.

5. The combination with a milk holding carton having four side walls and a top with an opening therein, of a transversely extending partition dividing the carton into a lower milk compartment and an upper cream compartment, said partition having a row of openings with edges paralleling one carton wall and fixed flaps extending from these edges downwardly and at an angle into the milk compartment and toward the opposite carton wall, the opposite edges of the row of openings being curved, the first mentioned carton wall having a mark on its outer surface to indicate that this wall must be kept uppermost when the carton is tilted into a horizontal pouring position, whereby the fixed flaps will reduce the effective heights of the openings so that a vacuum will be formed in the lower compartment to retain the milk therein while the cream is being dispensed from the upper compartment.

6. The combination with a milk holding carton having four side walls and a top with an opening therein, of a transversely extending partition dividing the carton into a lower milk compartment and an upper cream compartment, said partition having a row of openings in the shape of trapezoids with their parallel edges paralleling one carton wall, the shorter of the parallel edges being disposed nearer the partition center having fixed flaps extending from these edges and being inclined downwardly from these edges into the milk compartment so as to extend across the openings, the first mentioned carton wall having a mark on its outer surface to indicate that this wall must be kept uppermost when the carton is tilted into a horizontal pouring position, whereby the fixed flaps will reduce the effective heights of the openings so that a vacuum will be formed in the lower compartment to retain the milk therein while the cream is being dispensed from the upper compartment.

CLARENCE E. DEARDORFF.

REFERENCES CITED

The following references are of record in the file of this patent:

UNITED STATES PATENTS

| Number | Name | Date |
|---|---|---|
| 2,249,487 | Musolf | July 15, 1941 |
| 1,820,549 | Williams | Aug. 25, 1931 |
| 2,108,902 | Rasmussen | Feb. 22, 1938 |
| 2,321,660 | Courtney | June 15, 1943 |